Figure 1:
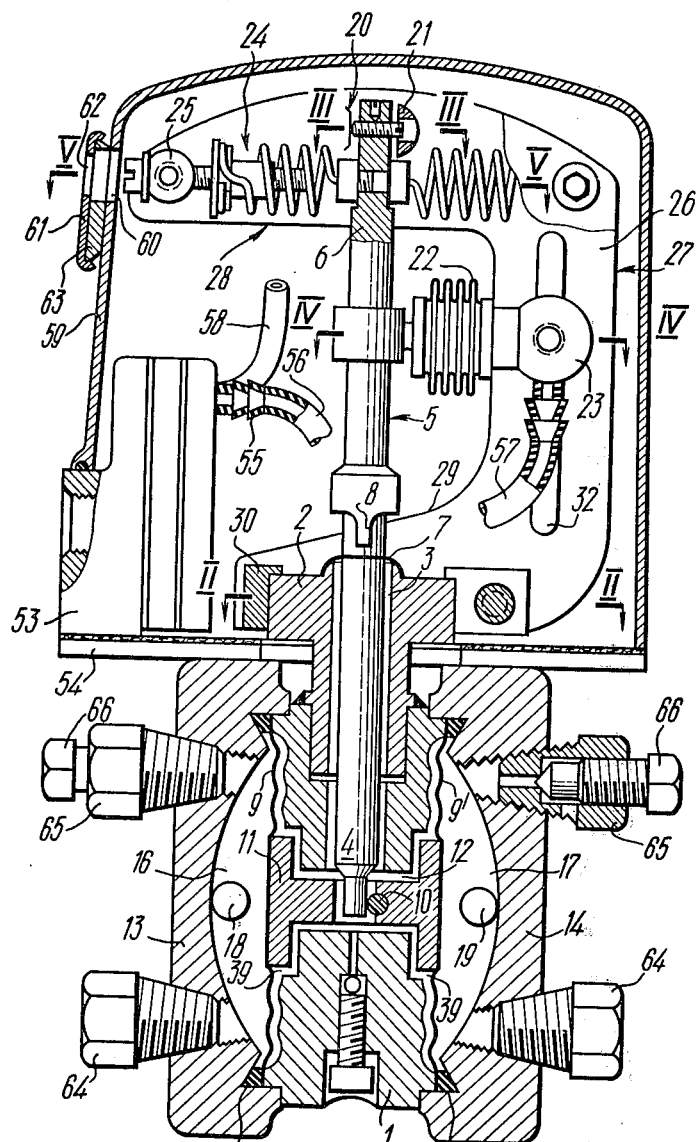

United States Patent [19]

Jurovsky et al.

[11] 3,939,712

[45] Feb. 24, 1976

[54] PNEUMATIC DIFFERENTIAL PRESSURE SENSOR

[76] Inventors: Albert Yakovlevich Jurovsky, ulitsa Baltiiskaya, 4, kv. 94; Gennady Samuilovich Zelenko, Schelkovskoe shosse, 90, kv. 120; Jury Markovich Brodkin, 1 ultisa Mashinostroenia, 8, kv. 43, all of Moscow, U.S.S.R.

[22] Filed: June 18, 1974

[21] Appl. No.: 480,496

[30] Foreign Application Priority Data
June 18, 1973 U.S.S.R. ............................. 1933183

[52] U.S. Cl. ............. 73/388 BN; 73/407 R; 137/85
[51] Int. Cl.² .......................................... G01L 7/00
[58] Field of Search ........... 73/388, 407 R, 388 BN; 137/85; 92/48, 99

[56] References Cited
UNITED STATES PATENTS
3,474,673  10/1969  Akeley ........................... 73/407 R FOREIGN PATENTS OR APPLICATIONS
790,294  2/1958  United Kingdom .................. 73/388

Primary Examiner—Richard E. Aegerter
Assistant Examiner—L. Footland

[57]  ABSTRACT

A pneumatic differential pressure sensor comprising a body with a hole which accommodates a pressed-in bushing, and a two-arm lever entering the body through the bushing so that one lever arm is inside the body and interacts with an element sensitive to the thermotechnical parameter while the other arm is outside the body. Secured to the bushing is a block carrying two clamps which serve as supporting elements for installing and fastening a zero corrector, a bellows and a nozzle-shutter element which interact with the other arm of the lever.

5 Claims, 5 Drawing Figures

U.S. Patent  Feb. 24, 1976  Sheet 2 of 2  3,939,712

PNEUMATIC DIFFERENTIAL PRESSURE SENSOR

The present invention relates to the instrument-building industry, and more particularly it relates to differential pressure sensors whose operating principle is based on power compensation.

A pneumatic differential pressure sensor is known in the art comprising a base, an element sensitive to the parameter being measured and transforming it into a force, a pneumatic force converter secured to the base and interacting with the sensitive element through a lever linkage, a nozzle-shutter element, a bellows, a zero corrector interacting with said lever linkage, a pneumatic relay whose control channel communicates pneumatically with the nozzle while the output channel communicates with the bellows and the sensor output (See. U.S. Pat. No. 2,806,480, dated Sept. 17, 1957.

In the known sensor the variations in the ambient temperature, the effects of external forces, and the vibrations cause considerable errors.

These errors are due, to a considerable extent, to the design features of the sensor, namely to the method of fastening the bracket carrying the nozzle, bellows, intermediate lever, and zero corrector to the body by screws located on the cantilever portions of the bracket, and creating a bending moment in the bracket, with said moment changing with the temperature of the ambient air.

Besides, additional errors are caused by the various degrees of rigidity with which the nozzle, bellows, and zero corrector are fastened to the bracket so that these parts are subjected to relative displacement when the bracket is acted upon by external forces, and on changes in the ambient temperature.

The provision of a two-lever linkage with unbalanced masses which change their position under the effect of vibrations, and inclinations of the sensor also increases the errors.

Besides, the arrangement and methods of fastening the nozzle shutter element, bellows, intermediate lever, and zero corrector hinder calibration and repairs of the sensor.

An object of the present invention lies in reducing the additional errors of the pneumatic differential pressure sensor.

Another object of the invention lies in simplifying the calibration of the instrument.

Still another object of the invention lies in increasing the vibration resistance of the pneumatic sensor.

The main object of the invention is to provide a pneumatic differential pressure sensor whose pneumatic output signal is less dependent on the changes in the temperature of the ambient temperature, on external forces, and vibrations.

These objects are accomplished by providing a pneumatic differential pressure sensor comprising a body with a hole through which a two-arm lever extends with a certain clearance in such a way that one arm is located inside, and the other arm outside the body, with the first arm interacting with the element sensitive to the parameter being measure accommodated in said body, while the second arm of the lever interacts with the nozzle-shutter element which communicates pneumatically with the inlet channel of a pneumatic amplifier which also has a channel for the supply pressure, and a channel for the pneumatic output signal which is at the same time the output of the pneumatic sensor, and which communicates with a bellows interacting with the second arm of said lever, with said arm being linked mechanically with a zero corrector wherein, according to the invention, the first arm of the lever extends into the hole in the body through a bushing with a flange secured on the body and carrying a lever support, with the portion of the bushing outside the body being embraced by a split block whose opposite sides are provided with two flat unidirectional clamps each having, one longitudinal side, and two transverse sides, with said clamps being arranged in the planes which are parallel to the swinging plane of the lever, and with their longitudinal sides are directed along the lever; installed between the clamps are crosspieces, one of which carries the nozzle-shutter element, another one carrying a bellows, and the third one a zero corrector.

It is practicable that the lever support should be made in the form of a membrane which closes the hole in the bushing, and is secured along the outer contour, and each of two rods fastened, to the lever at one end, and to the bushing at the other, thus ensuring lever swinging only in the lever plane.

It is practicable that the zero corrector should be made in the form of a coil spring, one end of which is fastened to the lever, and the other one to the bushing which interacts with the operating screw installed on the crosspiece in such a way that rotation of the screw changes the tension of the spring.

It is practicable that one end of the bellows should be secured on the bushing pressed into the crosspiece, and having a channel which puts the internal space of the bellows in communication with the output channel of the pneumatic signal of the pneumatic amplifier, and that the other end of the bellows should be fastened to the lever of a ring interacting with the lever, the crosspiece, the bellows, and with the ring being installed with a provision for moving it along the axis of the lever for calibration of the sensor.

It is possible to install a plate on the sensor body and to fasten a housing to this plate.

Figure 2:
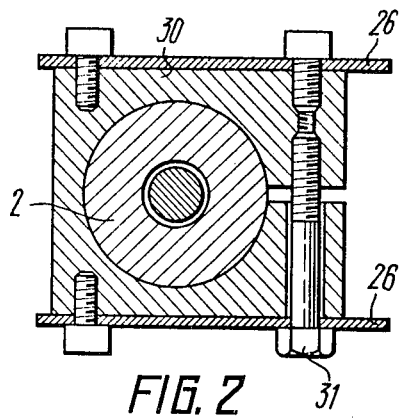
Figure 4:
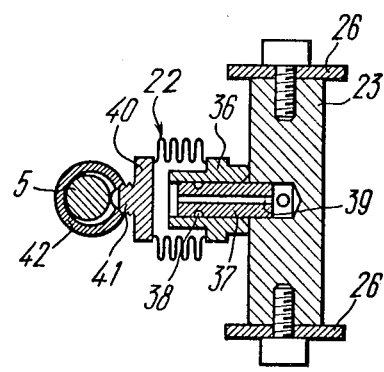
Figure 3:
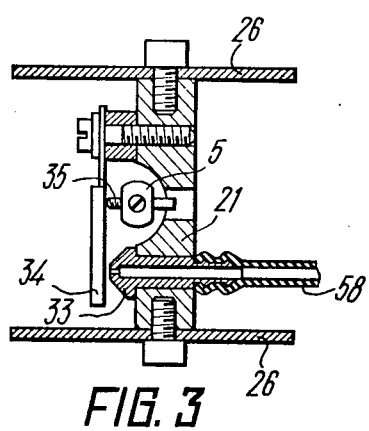
Figure 5:
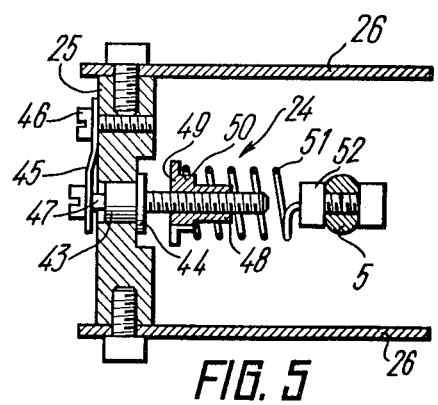

The invention is described in detail by way of example of a pneumatic differential pressure sensor, namely a differential pressure sensor according to the invention with reference to the accompanying drawings in which:

FIG. 1 shows the pneumatic differential pressure sensor, longitudinal section, according to the invention;
FIG. 2 is a section taken along line II—II in FIG. 1;
FIG. 3 is a section taken along line III—III in FIG. 1;
FIG. 4 is a section taken along line IV—IV in FIG. 1;
FIG. 5 is a section taken along line V—V in FIG. 1;

According to FIG. 1 the pneumatic differential pressure sensor comprises a body 1 with a bushing 2 welded to it. An arm extending with a certain clearance through the hole 3 of the bushing 2 into the body 1, is the two-arm lever 5. The arm 6 of the lever 5 is located outside the body 1. The support of the lever 5 is made in this case in the form of a membrane 7 which closes the hole 3 in the bushing 2 and is secured tightly on the bushing 2 along the outer contour, with the lever 5 passing through the membrane 7, and being tightly connected with the latter.

Two rods 8, fastened to the arm 6 of the lever 5 at one end, and to the bushing 2 at the other, ensure the swinging of the lever 5 only in the plane of the drawing.

The arm 4 of the lever 5 interacts with membranes 9 and 9' via a pin 10 in a rod 11 which connects rigidly the centres of the membranes 9 and 9', with the latter being welded hermetically along the outer contour to the body 1.

The space 12 between the membranes 7, 9 and 9' is filled with a liquid, e.g. polyethylene siloxane. The membranes 9 and 9' are closed by flanges 13 and 14, are sealed by fluorinated plastic gaskets 15 and form chambers 16 and 17 which are supplied with the pressure of the controlled medium through holes 18 and 19.

The arm 6 of the lever 5 located outside the body 1 interacts with a nozzle-shutter element 20 located on a cross-piece 21, with a bellows 22 mounted on a crosspiece 23, and with a zero corrector 24 mounted on a crosspiece 25.

The crosspieces 21, 23, and 25 are secured between two flat unidirectional clamps 26 which have one longitudinal side 27, and two transverse sides 28 and 29.

According to FIG. 2 the clamps 26 are fastened to the opposite sides of a split block 30 which is fastened to the bushing 2 by a screw 31. The block 30 (FIG. 1) is secured on the bushing 2 so that the clamps 26 are arranged in the planes parallel to the swinging plane of the lever 5, the with longitudinal sides 27 of said clamps 26 being directed along the lever 5. The longitudinal side 27 of each clamp 26 has a slot 32 provided for the movement of the crosspiece 23 with the bellows during calibration of the sensor.

As shown in FIG. 3 the nozzle-shutter element 20 comprises a nozzle 33 and a flexible shutter 34 fastened to the crosspiece 21. A screw 35 installed on the lever 5 contacts the shutter 34 and allows the latter to move relative to the edge of the nozzle 33 during the swinging of the lever 5.

As illustrated in FIG. 4 the bottom 36 of the bellows 22 is freely slipped on a bushing 37 secured to the crosspiece 23 and is sealed by a rubber ring 38. The bushing 37 has a channel 39 for feeding pneumatic pressure to the bellows 22. The bottom 40 of the bellows 22 has a threaded projection 41 screwed into a ring fitted around the lever 5. The face of the projection 41 contacts the cylindrical surface of the lever 5 and fixes the ring 42 on said lever 5.

As shown in FIG. 5 the zero corrector 24 is provided with an operating screw 43 with the head end inserted into the hole of the crosspiece 25 all the way to the stop formed by the projection 44. The projection 44 is pressed against the crosspiece by a plate spring 45, one end of which is fastened to the crosspiece 25 by a screw 46 while the other end is bent in the direction of the pressing force and inserted into a recess 47 on the cylindrical surface of the operating screw 43.

The threaded portion of the operating screw 43 has a threaded bushing 48 with a flange 49. The outer surface of the flange is provided with a groove 50 accommodating the end coil of the helical coil spring 51 with an interference.

The opposite end of the spring 51 is fastened in the hole of a threaded bushing 52 which is connected with the lever 5.

A pneumatic amplifier 53 (FIG. 1) is installed on a plate 54 which is secured on the flange 13. The pneumatic amplifier 53 has holes (not shown in FIG. 1) for feeding in a supply of pressure, and for delivering the pneumatic signal output of the sensor.

The pipe union 55 of the amplifier 53, the pipe 56 and the pipe union 57 secured on the crosspiece 23 connect the pneumatic output signal channel of the amplifier 53 with the internal space of the bellows 22.

A pipe 58 connects the control channel of the pneumatic amplifier 53 with the nozzle 33.

There is a housing 59 of the sensor with a hole 60 giving access to the zero corrector 24. The hole 60 is closed by a cylindrical cover 61 with an offset hole 62. The cover 61 is secured on a disc 63 and is capable of turning to close the hole 60.

The flanges 13 and 14 have plugs 64 for the drainage of the condensate, and plugs 65 for the discharge of gas, with both plugs being closed by needle valves;

The pneumatic differential pressure sensor operates as follows

As the pneumatic pressure is fed to the pneumatic amplifier 53, with both controlled pressures acting on membranes 9 and 9' being equal, a certain initial output signal is created at the sensor output and in the bellows 22, with said signal being controlled by the position of the shutter 34 with relation to the face edge of the outlet hole of the nozzle 33.

It should be noted that the shutter 34 is made of a flexible material and is fixed to the common cross piece 21 in which nozzle 33 is mounted. Screw 35 is mounted in lever 5 so that if screw 35 is not in contact with shutter 34, shutter 34 will close toward nozzle 33 and close the same off. The position of lever 5 is adjusted by the tension of spring 51 of the zero corrector 24 in such a manner as to provide for a contact cooperation of the screw 35 with shutter 34 and to space the shutter 34 apart from the nozzle 33 at a distance which would provide a predetermined initial value of the output signal of the apparatus.

The initial position of the shutter 34 relative to the nozzle 33 is set by tensioning the spring 51 with the aid of the operating screw 43. Adjustments of the stop 35 ensure contact between the arm 4 of the lever 5 and the pin 10.

The higher of the two controlled pressures is fed to the membrane 9 through the hole 19 in the flange 14, with the lower pressure being fed to the membrane 9 through the hole 18 in the flange 13. Each membrane 9 and 9' converts the corresponding pressures into proportional forces directed towards each other and acting along the common axis of the membranes 9, 9' and the rod 11. The resultant force which is equal to the difference of these forces is transmitted by the pin 10 to the lever 5 which turns through a certain angle about the rotation axis formed by the intersection of the plane of the sealing membrane 7 with the plane passing through the axes of two flexible rods 8.

Thus, when lever 5 moves responsive to the proportional forces at membrane 9 and 9' and rod 11, as transmitted by pin 10, the arm 6 of lever 5 is deflected away from shutter 34. This, in turn, moves the stop 35 so that shutter 34 is free to move toward nozzle 33. The shutter 34 follows the position of the stop 35 on the lever and approaches the face edge of the nozzle 33. The pressure in the control channel of the pneumatic relay 53 rises and so does the pressure at the sensor output and in the bellows 22.

Thus, the lever 5 is acted upon by the counteropposed moments of forces produced by the difference of two pressures in the spaces 16 and 17 and by the pressure in the bellows 22. When the acting moments are equal, the pressure in the bellows 22 and, consequently, at the sensor output, will be a measure of the difference between the two controlled pressures.

Calibration of the sensor for the standard, or required limits of variations in the output pneumatic signal is effected by changing the position of the bellows 22 with relation to the axis of rotation of the lever 5. This is done by loosening the screws which fasten the crosspiece 23 and the threaded projection 41. Then the ring 42 and the crosspiece 23 are freely moved along the lever 5 and fixed in the new position.

Replacement of the bellows 22 by another bellows with a different effective area can change substantially the setting range of the pneumatic sensor.

Though being simple and comprising but a few elements, the pneumatic sensor has high metrological and operational characteristics, viz., vibration resistance and a relative independence of the output pneumatic signal from the external forces, and ambient air temperature.

The pneumatic sensor can be utilized extensively as a means for primary information on parameters in various automatic control and regulation systems.

What is claimed is;

1. A pneumatic differential pressure sensor comprising: a body with a hole; a bushing installed in said hole so that a portion of said bushing is located inside said body and its other portion is outside the body; a two-arm lever extending through said bushing into the body so that one arm of said lever is inside the body and the other arm outside it; a support for said lever secured to said bushing outside said body; a split block fitted around said bushing and secured to the external portion of the bushing; two flat unidirectional clamps secured to the opposite sides of said block, each clamp having one longitudinal side and two transverse sides, and being located in the planes which are parallel to the swinging plane of said lever; at least three crosspieces installed between said clamps; a pneumatic amplifier having means for feeding supply pressure to said amplifier, inlet means, pneumatic output signal means from said amplifier, which serves simultaneously as the output of the pneumatic sensor; an element sensitive to the differential pressure accomodated in said body; a nozzle-shutter element secured to one of the crosspieces and communicating pneumatically with the inlet means of the pneumatic amplifier; one arm of said two-arm lever interacting with said element sensitive to the differential pressure, and the other arm interacting with said nozzle-shutter element; a bellows secured to the second crosspiece communicating pneumatically with the sensor output and interacting with the other arm of said lever; and a zero indicator secured to the next crosspiece and linked kinematically with the other arm of said lever.

2. A pneumatic sensor according to claim 1, wherein said lever support is made in the form of a membrane which closes the hole in the bushing, and is secured along the outer contour, and two rods fastened to the lever at one end, and to the bushing at the other, thus allowing the lever to swing in one plane only.

3. The pneumatic sensor according to claim 1 wherein said zero corrector is made in the form of a coil spring, one end of which is fastened to the lever, while the other one is fastened to the bushing interacting with an operating screw installed in the second crosspiece, so that rotation of the operating screw changes the tension of said spring.

4. The pneumatic sensor according to claim 1, wherein one end of the bellows is slipped onto the bushing pressed into the next crosspiece, and has a channel communicating the inside space of the bellows with the output pneumatic signal channel of the amplifier, while the other end of the bellows is linked kinematically with the lever by means of a ring embracing the lever, the crosspiece, the bellows, and with the ring being installed with a provision for moving the lever along an axis during calibration of the sensor.

5. The pneumatic sensor according to claim 1, further comprising a plate secured to said body, and a housing installed on said plate.

* * * * *